United States Patent
Hepkin et al.

(10) Patent No.: US 7,240,177 B2
(45) Date of Patent: Jul. 3, 2007

(54) SYSTEM AND METHOD FOR IMPROVING PERFORMANCE OF DYNAMIC MEMORY REMOVALS BY REDUCING FILE CACHE SIZE

(75) Inventors: David Alan Hepkin, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 10/855,847

(22) Filed: May 27, 2004

(65) Prior Publication Data

US 2005/0268052 A1 Dec. 1, 2005

(51) Int. Cl.
*G06F 12/00* (2006.01)
(52) U.S. Cl. .............. 711/173; 711/159; 711/129; 711/133
(58) Field of Classification Search ........... 711/173, 711/118, 129, 133, 159
See application file for complete search history.

(56) References Cited

U.S. PATENT DOCUMENTS

| | | | |
|---|---|---|---|
| 6,681,305 B1 * | 1/2004 | Franke et al. ........... | 711/170 |
| 6,766,420 B2 * | 7/2004 | Rawson, III ............ | 711/133 |
| 6,956,507 B2 * | 10/2005 | Castelli et al. .......... | 341/50 |
| 6,968,424 B1 * | 11/2005 | Danilak ................. | 711/113 |
| 7,047,387 B2 * | 5/2006 | Goodsell ................ | 711/170 |
| 2005/0015562 A1 * | 1/2005 | Goodsell ................ | 711/170 |

OTHER PUBLICATIONS

IBM, "Dynamic Logical Partitioning in IBM eserver pSeries", First Edition, Oct. 8, 2002, pp. i-9.

* cited by examiner

*Primary Examiner*—Matthew Kim
*Assistant Examiner*—Hetul Patel
(74) *Attorney, Agent, or Firm*—Duke W. Yee; Casimer K. Salys; Rakesh Garg (57) ABSTRACT

A system and method for improving dynamic memory removals by reducing the file cache size prior to the dynamic memory removal operation initiating are provided. In one exemplary embodiment, the maximum amount of physical memory that can be used to cache files is reduced prior to performing a dynamic memory removal operation. Reducing the maximum amount of physical memory that can be used to cache files causes the page replacement algorithm to aggressively target file pages to bring the size of the file cache below the new maximum limit on the file cache size. This results in more file pages, rather than working storage pages, being paged-out.

14 Claims, 3 Drawing Sheets

SYSTEM AND METHOD FOR IMPROVING PERFORMANCE OF DYNAMIC MEMORY REMOVALS BY REDUCING FILE CACHE SIZE

BACKGROUND OF THE INVENTION

1. Technical Field

The present invention is generally directed to an improved data processing system. More specifically, the present invention is directed to a system and method for improving the performance of dynamic memory removals in a data processing system by reducing the file cache size.

2. Description of Related Art

In systems that support dynamic logical partitioning (DLPAR), such as IBM's eserver pSeries computer systems, resources may be dynamically moved between partitions within the system. The moving of resources between partitions may be performed for various different reasons. For example, it may be desirable to consolidate a plurality of virtual machines, new logical partitions may be initiated requiring a rebalancing of resources, web servers associated with various ones of the logical partitions may have different peak usage times requiring moving of resources between the logical partitions at different times of day to accommodate the peak usages, and the like.

With DLPAR systems, resources are moved between partitions dynamically, i.e. performed non-disruptively while partitions continue to run. When DLPAR operations are in progress, the performance of the operating system may suffer slightly as resources are being examined and rebalanced. When a resource is added, it is immediately made available for use, in the same way as if the operating system had booted with the resource. More information about Dynamic Logical Partitioning in the eserver pseries computing devices may be found in the whitepaper entitled "Dynamic Logical Partitioning in IBM eserver pseries," International Business Machines Corporation, Oct. 8, 2002, available from International Business Machines Corporation at www1.ibm.com/servers/eserver/pseries/hardware/whitepapers/dl par.html, which is hereby incorporated by reference.

Most DLPAR operations can be performed in a short amount of time and, in general, the performance benefit associated with resource addition and removal will scale proportionally to the change in resources. One main exception is memory removal. When an operating system dynamically removes real memory from a running system, the performance of the system is often negatively impacted, especially if the majority of physical memory is in-use.

The Advanced Interactive Executive (AIX) operating system uses virtual memory to address more memory than is physically available in the system. The management of memory pages in RAM or on disk is handled by the Virtual Memory Manager (VMM). Virtual-memory segments are partitioned in units called pages. A paging space is a type of logical volume with allocated disk space that stores information which is resident in virtual memory but is not currently being accessed. This logical volume has an attribute type equal to paging, and is usually simply referred to as paging space or swap space. When the amount of free RAM in the system is low, programs or data that have not been used recently are moved from memory to paging space to release memory for other activities.

On a system where physical memory is heavily utilized, dynamically removing a range of memory will result in a significant amount of paging activity as virtual memory pages are written out to disk to accommodate the system's smaller physical memory size. The virtual memory pages involved in these mass page-outs can be broken into two categories. The first category is file pages that are used to cache file data in physical memory. Because file pages are paged out to the same location on disk from which they came, paging space does not need to be allocated for file pages residing in RAM.

The second is working storage pages which are used for processes data heap, stack, shared memory, etc. Working storage pages are transitory and exist only during their use by a process. Working storage pages have no permanent disk storage location. Working storage pages must also occupy disk storage locations when they cannot be kept in real memory. The disk paging space is used for this purpose. Working storage pages in RAM that can be modified and paged out are assigned a corresponding slot in paging space. The allocated paging space is used only if the working storage page needs to be paged out. However, an allocated page in paging space cannot be used by another working storage page. It remains reserved for a particular working storage page for as long as that page exists in virtual memory.

When a process references a virtual-memory page that is on disk, because it either has been paged out (written to disk or paging space) or has never been read, the referenced page must be paged in, and this might cause one or more pages to be paged out if the number of available (free) page frames in RAM is low. The VMM attempts to steal page frames that have not been recently referenced and, therefore, are not likely to be referenced in the near future, using a page-replacement algorithm.

A successful page-replacement keeps the memory pages that are actively being referenced in RAM, while the memory pages not being actively referenced are paged out. However, when the RAM is over-committed, it becomes difficult to choose pages for page out. This is because the pages will probably be referenced in the near future by currently running processes. The result is that pages that are likely to be referenced soon might still get paged out and then paged in again when actually referenced. When RAM is over-committed, continuous paging in and paging out, called thrashing, can occur. When a system is thrashing, the system spends most of its time paging in and paging out instead of executing useful instructions, and none of the active processes make any significant progress. The VMM has a memory load control algorithm that detects when the system is thrashing and then attempts to correct the condition.

On systems where all of the physical memory, e.g., RAM, can be shared between file pages and working storage pages, the page replacement algorithm will not distinguish between replacing file and working storage pages. Thus, the mass amount of page-out input/output (I/O) operations that are initiated during a memory remove operation often involves a significant amount of working storage pages. This can have severe negative performance impacts on a system for several reasons. One of the principal reasons is that, because many of the pages being paged out may correspond to the working storage virtual memory used for different processes' working sets, and a large number of pages must be paged out to accommodate the memory removal operations, many of the pages that are paged out may need to be paged back in as the applications continue to run and re-reference the paged out memory pages. Thus, significant thrashing is generated as processes bring their working set of pages back into physical memory.

Having a large number of processes waiting for page-ins to complete can make the system almost unusable until the processes' working sets have been brought back into physical memory. Thus, not only is the system's performance bad during a memory remove operation, but a system's performance may remain poor for a significant duration even after a memory remove operation has completed.

Another reason for the significant negative affects of dynamic memory removal is that most high-end systems are configured with a small amount of paging space that is usually only spread among a very small number of disks. The large amount of paging activity that is generated during a dynamic memory removal operation is often bottle-necked by the small number of disks that are used for paging space. This results in long waits for I/O operations to complete.

Thus, it would be desirable to have an improved mechanism for performing dynamic memory removals that avoids the drawbacks set forth above.

SUMMARY OF THE INVENTION

The present invention provides a system and method for improving dynamic memory removals by reducing the file cache size prior to the dynamic memory removal operation initiating. In one exemplary embodiment of the present invention, the maximum amount of physical memory that can be used to cache files is reduced prior to performing a dynamic memory removal operation. Reducing the maximum amount of physical memory that can be used to cache files causes the page replacement algorithm to aggressively target file pages to bring the size of the file cache below the new maximum limit on the file cache size. This results in more file pages, rather than working storage pages, being paged-out.

As a result of the change in the maximum physical memory for file caching, a much larger percentage of working storage pages, being used for different processes' working sets, remain in memory. Thus, the majority of processes on the system do not see a performance hit due to page-faulting on their working storage pages (i.e., their data and stack).

In addition, on most high-end systems, the size and number of disks used for file systems is significantly larger than the relatively small size and number of disks used for paging space. Thus, when paging out file pages to disk, the page-outs are spread over a much larger number of disks resulting in much higher I/O throughput than when paging working storage pages.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
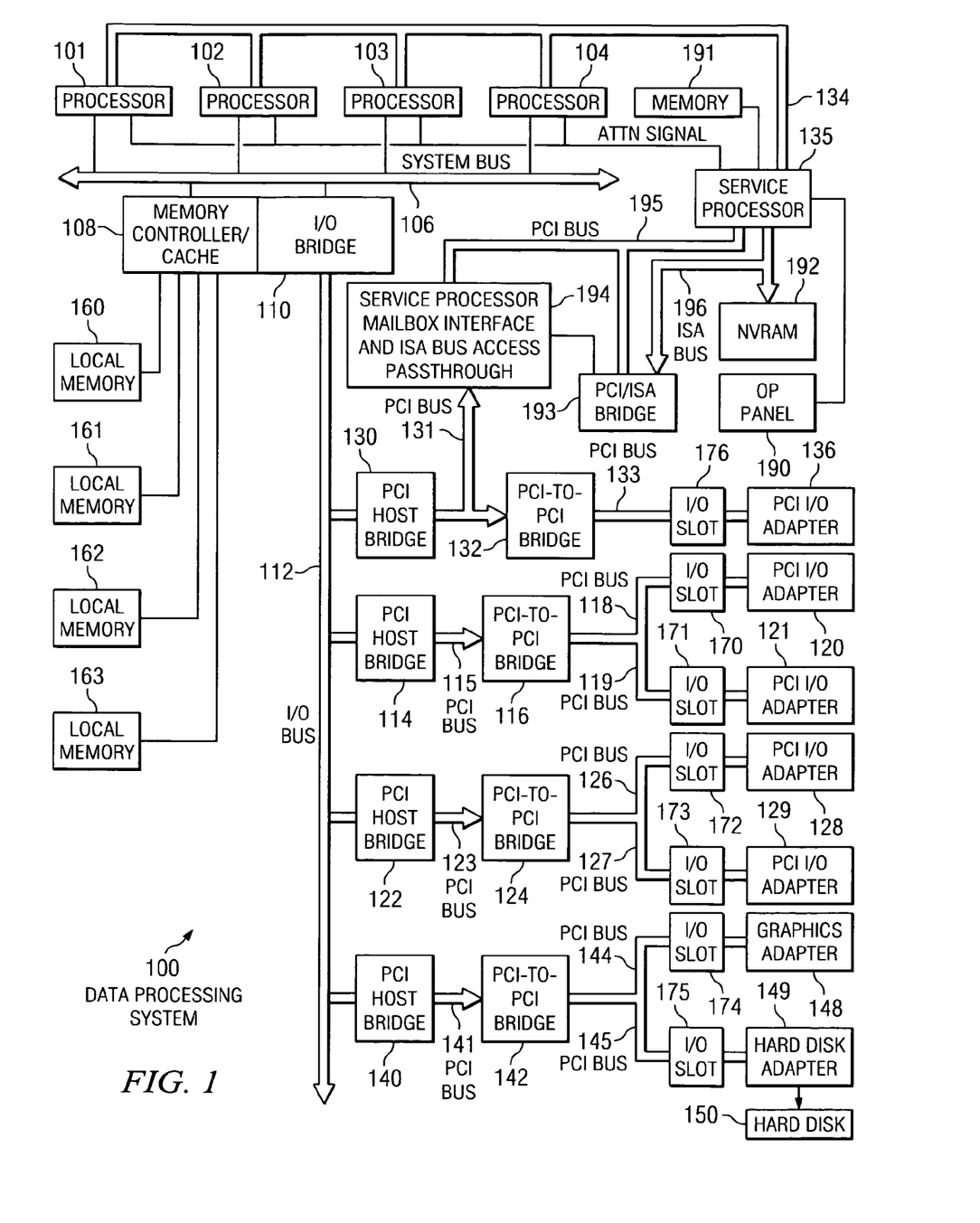
FIG. 1 is a block diagram of a data processing system in which the present invention may be implemented.
Figure 2:
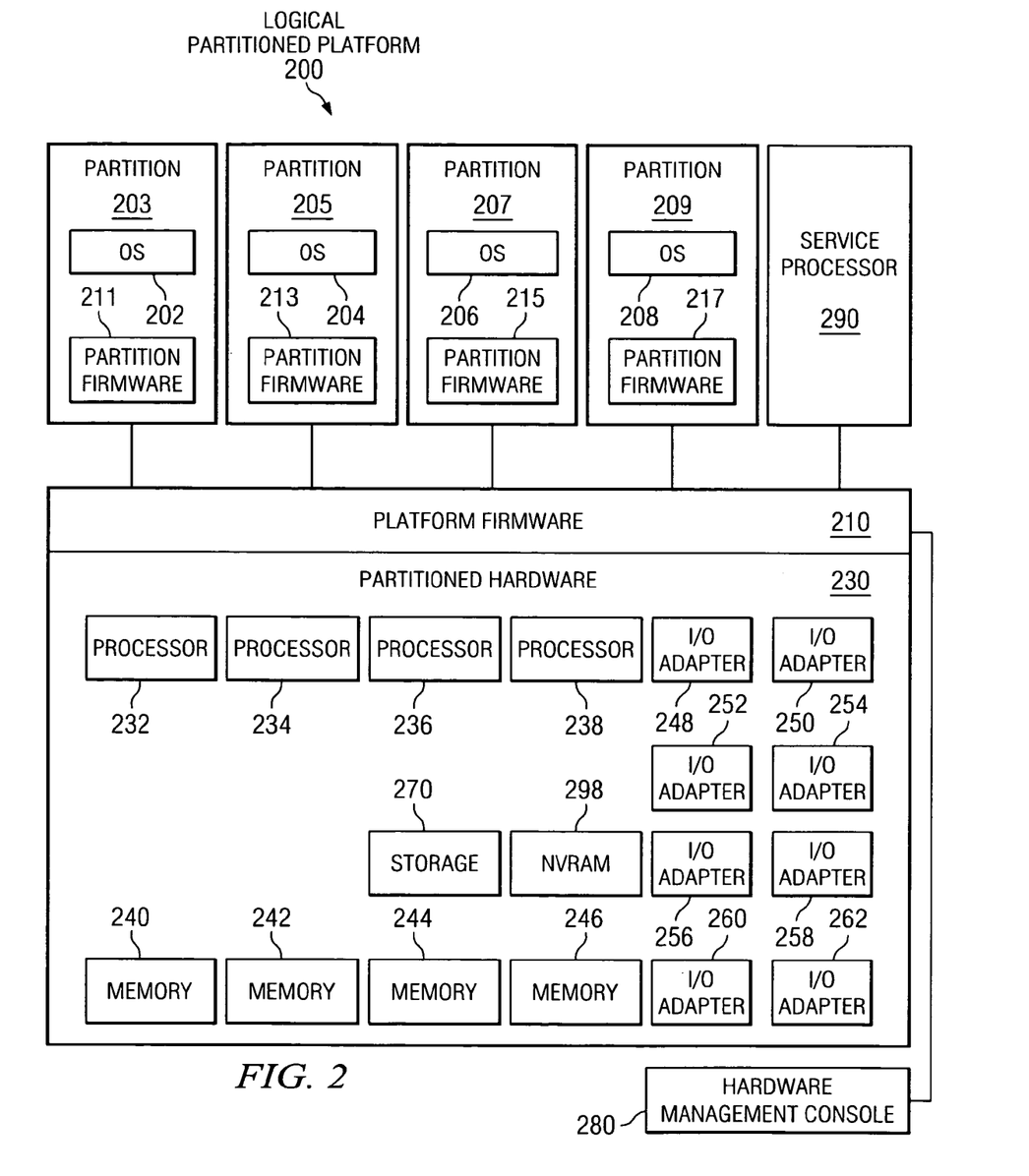
FIG. 2 is a block diagram of an exemplary logical partitioned platform in which the present invention may be implemented.

The present invention provides a mechanism for improving upon dynamic memory removals in data processing systems. While the present invention may be used with many different types of data processing systems having many different types of configurations, the present invention is especially well suited for logically partitioned data processing systems in which resources are dynamically reassigned from one partition to another as resource needs change. The following FIGS. 1–2 are example figures of one possible logically partitioned data processing system environment in which aspects of the present invention may be implemented. It should be appreciated that FIGS. 1–2 are only exemplary and many modifications to the configurations illustrated may be made without departing from the spirit and scope of the present invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eserver data processing system, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and memory from local memories 160–163 is assigned to each of the three partitions. In these examples, memories 160–163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160–163, and I/O adapters 120, 128, and 129 may be assigned to logical partition P1; processors 102–103, some portion of memory from local memories 160–163, and PCI I/O adapters 121 and 136 may be assigned to partition P2; and processor 104, some portion of memory from local memories 160–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases host processors 101–104 for execution of the code loaded into local memory 160–163. While host processors 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 or pseries system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide-various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

As discussed previously, in a logically partitioned data processing system environment, such as that described above with regard to FIGS. 1 and 2, dynamic reallocation of resources to the various logical partitions is often performed. One operation that is performed during reallocation of memory is memory removal, i.e. removal of an allocation of a portion of memory from one logical partition and reallocation of that portion of memory to another logical partition. As mentioned above, removal of memory may be a performance restrictive operation. The present invention provides a mechanism for lessening the impact of memory removal operations on the performance of the logically partitioned data processing system environment during dynamic logical partition operations.

The present invention improves dynamic memory removals by reducing the file cache size of the portion of memory that is being removed prior to the dynamic memory removal operation initiating. In one exemplary embodiment of the present invention, the maximum amount of physical memory that can be used to cache files is reduced prior to performing a dynamic memory removal operation. Reducing the maximum amount of physical memory that can be used to cache files causes the page replacement algorithm to aggressively target file pages to bring the size of the file cache below the new maximum limit on the file cache size. This results in more file pages, rather than working storage pages, being paged-out.

As a result of the change in the maximum physical memory for file caching, a much larger percentage of working storage space pages, being used for different processes' working sets, remain in memory. Thus, the majority of processes on the system do not see a performance hit due to page-faulting on their working storage pages (i.e., their data and stack).

In addition, on most high-end systems, the size and number of disks used for file systems is significantly larger than the relatively small size and number of disks used for paging space. Thus, when paging out file pages to disk, the page-outs are spread over a much larger number of disks resulting in much higher I/O throughput than when paging working storage pages.

Figure 3:
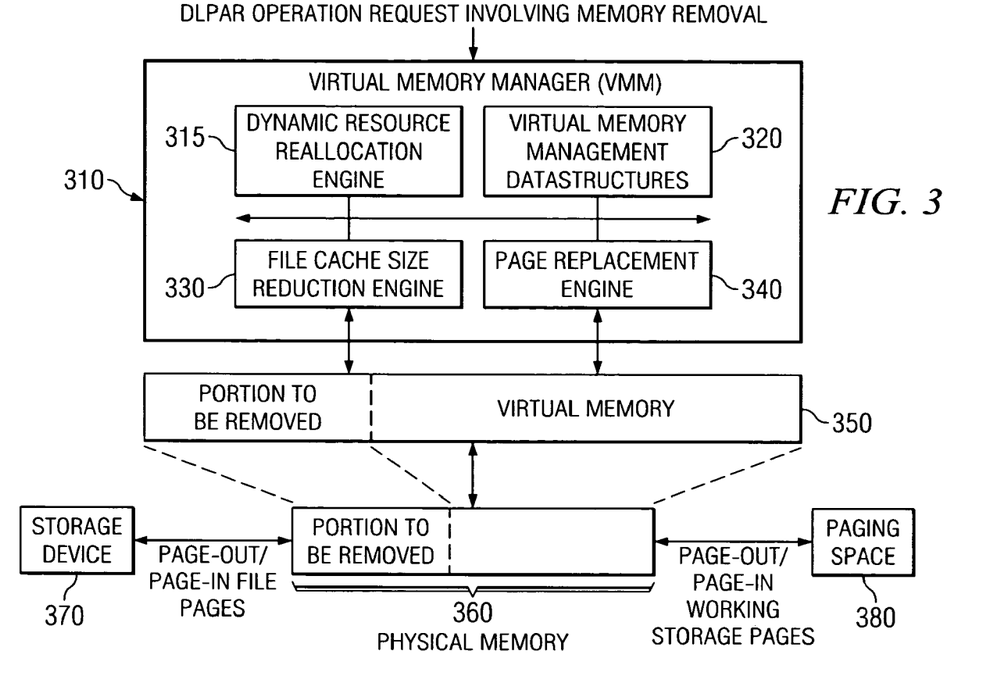
FIG. 3 is an exemplary diagram illustrating an operation of the present invention when performing a memory removal DLPAR operation.

FIG. 3 is an exemplary diagram illustrating an operation of the present invention when performing a memory removal DLPAR operation. As shown in FIG. 3, a virtual memory manager (VMM) 310, which may be part of an operating system in a partition, for example, may perform the operations of the present invention. Alternatively, the present invention may be implemented as a separate dedicated device that communicates with the partitions, such as a hardware management console, as part of the partition management infrastructure, as part of the hypervisor, or the like.

It should be appreciated that while FIG. 3 illustrates that both the targeted virtual memory 350 and the portion of the physical memory 360 that are the subject of the dynamic memory removal operation are contiguous ranges of memory addresses for simplicity, the present invention is not limited to such. Rather, in actuality, the virtual and physical memory 350 and 360 that are part of the dynamic memory removal operation may be, and often will be, discontiguous. However, the operations of the present invention operate in the same manner whether or not the virtual and physical memory address ranges targeted by the dynamic memory removal operation are contiguous or discontiguous.

In the depicted example, the VMM 310 receives a dynamic logical partition (DLPAR) operation request that requires the removal of memory from a logical partition. The VMM 310 includes a plurality of engines that aid in performing this memory removal operation, i.e. a dynamic resource reallocation engine 315, virtual memory management data structures 320, file cache size reduction engine 330, and page replacement-engine 340.

The dynamic resource reallocation engine 315 of the VMM 310 receives the DLPAR operation request and determines that a memory removal operation is required. Based on information maintained by the VMM 310 in the virtual memory management data structures 320, the dynamic resource reallocation engine 315 identifies the virtual memory 350 that is targeted by the DLPAR operation.

The virtual memory management data structures 320 further store information regarding the file cache size for each of the virtual memories managed by the VMM 310. This information is retrieved by the dynamic resource reallocation engine 315 and is used to identify the file cache size associated with this targeted virtual memory 350.

Prior to actually performing operations to page-out memory pages from physical memory 360 associated with the targeted virtual memory 350, the file cache size reduction engine 330 reduces the size of the file cache associated with the targeted virtual memory 350. That is, the file cache size attribute maintained in the virtual memory management data structures 320 for the virtual memory 350, which is associated with the physical memory 360, is overwritten with a smaller value.

The dynamic resource reallocation engine 315 then instructs the page replacement engine 340 to page-out memory pages, stored in the physical memory 360, to free a portion of the virtual memory 360 so that it may be deallocated by the dynamic resource reallocation engine 315. As mentioned above, the paging-out of memory pages in the physical memory 360 may include writing file pages to a storage device 370 having the file system associated with the file pages and may include writing working storage pages to a paging space 380.

Because working storage pages are used by currently running processes, it is not efficient to write these working storage pages to a paging space 380 since they will need to be paged back in when the running processes need to access the data stored in these working storage pages. This results in frequent page-outs and page-ins of working storage pages while the memory removal operation is being performed and can greatly affect the performance of the overall data processing system. Thus, it would be beneficial to keep as many of the working storage pages as possible in the physical memory 360 during the memory removal operation.

File pages are not as frequently accessed as working storage pages and thus, the thrashing that may occur with working storage pages is not as prevalent with file pages. Moreover, file pages are written to storage devices, such as storage device 370. Typically, there will be more storage devices provided for storing of file pages than there is for providing the paging space 380. As a result, the throughput in paging-in and paging-out file pages from/to storage devices is greater than for paging-in and paging-out working storage pages from/to the paging space 380.

In most cases, a memory removal operation will only cause memory to be paged out when the amount of memory being removed is greater than the current amount of free memory in the partition. For example, if a partition has 128 MB of physical memory that is not being used and a memory removal operation removes 64 MB of physical memory from the partition, the partition will not page out memory because it still has 64 MB of memory that's not being used. The present invention provides a mechanism for improving upon memory removal operations that require paging out of memory. Thus, the present invention is most useful when a partition's memory is fully utilized (or almost fully utilized). The present invention, in order to take advantage of the benefits associated with maintaining working storage pages in physical memory 360 during the memory removal operation and the increased throughput associated with paging-in/paging-out file pages, reduces the size of the file cache associated with the virtual memory 350 so as to favor the working storage pages during the memory removal operation performed by the page replacement engine 340.

The memory removal operation may involve paging-out memory pages from the physical memory 360 to either a storage device 370 (in the case of file pages) or a paging space 380 provided by other storage devices (in the case of working storage pages). Since the file cache size is smaller, the page replacement engine 340 will first page-out file pages in the physical memory 360 until the number of bytes of physical memory 360 meets or is below the smaller file cache size requirements. Thereafter, the page replacement engine 340 may page-out file pages or working storage pages in a manner similar to that of the known memory removal mechanisms.

Since the file cache size is smaller, more file pages are written from physical memory 360 to storage device 370 during the memory removal operation performed by the page replacement engine 340 in order to make sure that the total number of bytes of memory in the physical memory 360 that store file pages is less than or equal to the smaller file cache size. Moreover, since more file pages are written to storage device 370, not as many working storage pages need to be written to the paging space 380. That is, more working storage pages are maintained in the physical memory 360 during the memory removal operation. As a result, many of the running processes will encounter their working storage pages in physical memory 360 and need not page-in the working storage pages from paging space 380.

Once the memory removal operation is completed by the page replacement engine 340, the file cache size attribute associated with the smaller virtual memory 350 and corresponding physical memory 360 may be adjusted to an appropriate amount. That is, the file cache size may be increased to a size commensurate with the previous file cache size, to a size that is commensurate with the previous file cache size relative to the remaining physical memory 360, or the like.

There are many different ways to determined by how much the file cache size should be reduced prior to performing the memory removal operation and by how much the file cache size should be increased after the memory removal operation is completed. The present invention is not limited to any one manner by which to determine these quantities and any suitable mechanism for determining how much to reduce and how much to increase the size of the file cache may be used without departing from the spirit and scope of the present invention.

In a preferred embodiment, the determination as to how much to reduce the size of the file cache in order to favor working storage pages over file pages as being kept in physical memory 360, is based on the size of the physical memory that is being reduced, the total amount of available physical memory, i.e. free space in the physical memory, and the current setting for the maximum file cache size. The new file cache size is determined as a function of these values.

For example, in one exemplary embodiment of the present invention, when the dynamic logical partition (DLPAR) operation is started, a determination is made as to whether the percentage of physical memory 360 that is free (MFREE), i.e. not being used, is less than the percentage of physical memory 360 that will be removed as part of the DLPAR operation (MRM). If not, then there is more free physical memory than the amount of memory to be removed and thus, page replacement is not necessary.

If MFREE is less than MRM, then the maximum percentage of physical memory 360 that can be used for storing file pages (FMAX), i.e. the file cache size limit, is set using the following equation:

$$FMAX=FCUR-MRM+MFREE$$

where FCUR is the current percentage of physical memory that is being used for storage of file pages, i.e. the current amount of the file cache size being used to store file pages. This will reduce the file cache size by the amount of in-use physical memory that is being removed. The amount of free memory is accounted for in the above equation to ensure that the FMAX limit is not reduced too low. Page replacement by the page replacement engine 340 is only needed when all of the physical memory 350 is in-use (i.e. when MFREE=0). Thus, if there is a large percentage of free memory (e.g., MRM=5% and MFREE=4%), then page replacement will only be needed to page out a small portion (e.g., 1%) of the physical memory 360 as a result of the memory remove operation.

When new page frames are requested during the memory remove operation and MFREE=0, page replacement will start and will target file pages because the file cache size is over its limit. Reducing the file cache size by the amount of in-use memory being removed, in accordance with this embodiment of the present invention, ensures that file pages should be targeted for the duration of the memory remove operation.

In addition, FMAX is set to FCUR−MRM+MFREE rather than FMAX−MRM+MFREE in order to ensure that file pages are always targeted in this embodiment of the present invention. For example, consider a system where FCUR=50%, FMAX=80%, MRM=5%, and MFREE=0%. Reducing FMAX (80%) by MRM (5%) will not cause file pages to be targeted because the amount of memory being used for file pages (FCUR=50%) is still less than the maximum amount of memory that can be used as a file cache (FMAX). Thus, if page replacement starts during the memory remove operation, the page replacement engine 340 will not aggressively target file pages because they are below their file cache size limit. Thus, in this embodiment, to ensure that file pages are aggressively targeted by the page replacement engine 340, the reduction of FMAX takes into account the current percentage of physical memory 360 that is being used for storing file pages.

As mentioned above, after the memory remove operation is complete, the file cache size limit may be increased. For example, the FMAX value may be raised back to its original percentage. However, the actual FMAX limit as a unit of bytes will be less because the total amount of physical memory 360 left after the memory remove operation will be less. For example, consider a system that starts with 100 GB of physical memory allocated to a logical partition and 10 GB is removed due to a memory remove operation. If FMAX is 50% before the memory remove operation starts, then only 50 GB of memory can be used as a file cache. After the memory remove operation is complete and FMAX is set back to its original value of 50%, the actual amount of memory that can be used as a file cache will be 45 GB.

Thus, the present invention provides a mechanism for ensuring that file pages are aggressively targeted for paging-out during a memory remove operation. This leaves more working storage pages in physical memory during the memory remove operation and thus, reduces the overhead of the processors with regard to repeatedly paging-in and paging-out working storage pages during the memory remove operation.

Figure 4:
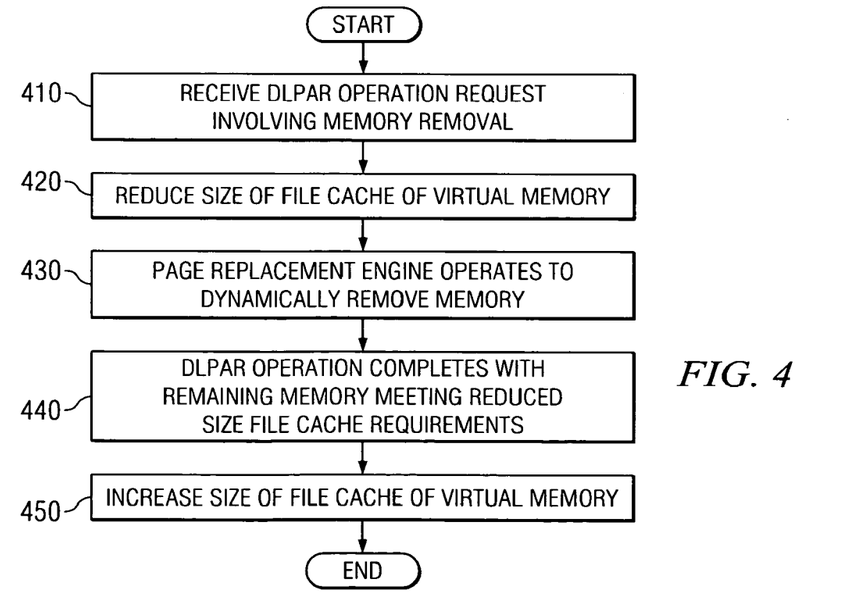
FIG. 4 is a flowchart outlining an exemplary operation of the present invention.

FIG. 4 is a flowchart outlining an exemplary operation of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by receiving a dynamic logical partition operation request that involves memory removal (step 410). As a preliminary step, prior to performing page replacement, the size of the file cache of the virtual memory that is targeted by the memory removal is reduced (step 420). The page replacement operation may then operates to page-out pages of memory associated with the memory that is to be removed, if paging out is necessary, and then deallocates the memory from the logical partition (step 430). The dynamic logical partition operation then completes with the remaining memory allocated to the logical partition meeting the reduced size file cache requirements set in step 420 (step 440). Thereafter, the file cache size of the remaining virtual memory is increased to an appropriate size (step 450) and the operation terminates.

Thus, the present invention provides a mechanism for reducing the performance degradation associated with known memory removal operations by favoring working storage space pages over file pages as remaining in memory during the memory removal operation. Because of this, the majority of processes running in the data processing system do not need to keep paging-in memory pages in order to perform their functions. That is, the probability that thrashing is encountered during the memory removal operation is lessened by the present invention. In addition, when paging out file pages to disk, the page-outs are spread over a much larger number of disks resulting in much higher I/O throughput than when paging working storage pages.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for removing a portion of physical memory from being allocated to an operating system, comprising:
   reducing an original file cache size associated with the physical memory to thereby generate a reduced file cache size;
   performing a memory removal operation on the portion of physical memory based on the reduced file cache size to form a reduced physical memory, wherein the memory removal operation results in a removal of an allocation of the portion of physical memory to an operating system, and wherein the memory removal operation favors paging-out file pages stored in the physical memory to reduce a number of bytes of the physical memory that store file pages to be equal to or lower than the reduced file cache size; and
   increasing the reduced file cache size to a larger file cache size after completion of the memory removal operation, wherein the reduced file cache size is increased by an amount such that the larger file cache size is the same relative percentage of the reduced physical memory as the original file cache size is of the physical memory.

2. The method of claim 1, wherein reducing the original file cache size associated with the physical memory includes setting the reduced file cache size based on a function of a size of the portion of physical memory, an amount of free space in the physical memory and a current setting for the file cache size.

3. The method of claim 1, wherein reducing the original file cache size associated with the physical memory includes setting the reduced file cache size based on the following equation:

$$FMAX = FCUR - MRM + MFREE$$

where MFREE is an amount of physical memory that is not being used, MRM is an amount of physical memory that will be removed, FMAX is the reduced file cache size, and FCUR is a current amount of physical memory that is being used for storage of file pages.

4. The method of claim 1, wherein reducing the original file cache size and performing the memory removal operation are performed in response to receiving a dynamic logical partition operation that requires reallocation of physical memory.

5. The method of claim 1, wherein the method is implemented in a virtual memory manager of a logically partitioned data processing system.

6. A computer program product in recordable computer readable medium for removing a portion of physical memory from being allocated to an operating system, comprising:
   first instructions for reducing an original file cache size associated with the physical memory to thereby generate a reduced file cache size;
   second instructions for performing a memory removal operation on the portion of physical memory based on the reduced file cache size to form a reduced physical memory, wherein the memory removal operation results in a removal of an allocation of the portion of physical memory to an operating system, and wherein the memory removal operation favors paging-out file pages stored in the physical memory to reduce a number of bytes of the physical memory that store file pages to be equal to or lower than the reduced file cache size; and
   third instructions for increasing the reduced file cache size to a larger file cache size after completion of the memory removal operation, wherein the reduced file cache size is increased by an amount such that the larger file cache size is the same relative percentage of the reduced physical memory as the original file cache size is of the physical memory.

7. The computer program product of claim 6, wherein the first instructions for reducing the original file cache size associated with the physical memory include instructions for setting the reduced file cache size based on a function of a size of the portion of physical memory, an amount of free space in the physical memory and a current setting for the file cache size.

8. The computer program product of claim 6, wherein the first instructions for reducing the original file cache size associated with the physical memory include instructions for setting the reduced file cache size based on the following equation:

$$FMAX = FCUR - MRM + MFREE$$

where MFREE is an amount of physical memory that is not being used, MRM is an amount of physical memory that will be removed, FMAX is the reduced file cache size, and FCUR is a current amount of physical memory that is being used for storage of file pages.

9. The computer program product of claim 6, wherein the first instructions and second instructions are executed in response to receiving a dynamic logical partition operation that requires reallocation of physical memory.

10. A system for removing a portion of physical memory from being allocated to an operating system, comprising:
    means for reducing an original file cache size associated with the physical memory to thereby generate a reduced file cache size;
    means for performing a memory removal operation on the portion of physical memory based on the reduced file cache size to form a reduced physical memory, wherein the memory removal operation results in a removal of an allocation of the portion of physical memory to an operating system, and wherein the memory removal operation favors paging-out file pages stored in the physical memory to reduce a number of bytes of the physical memory that store file pages to be equal to or lower than the reduced file cache size; and
    means for increasing the reduced file cache size to a larger file cache size after completion of the memory removal operation, wherein the reduced file cache size is increased by an amount such that the larger file cache size is the same relative percentage of the reduced physical memory as the original file cache size is of the physical memory.

11. The system of claim 10, wherein the means for reducing the original file cache size associated with the physical memory includes means for setting the reduced file cache size based on a function of a size of the portion of physical memory, an amount of free space in the physical memory and a current setting for the file cache size.

12. The system of claim 10, wherein the means for reducing the original file cache size associated with the physical memory includes means for setting the reduced file cache size based on the following equation:

$$FMAX = FCUR - MRM + MFREE$$

where MFREE is an amount of physical memory that is not being used, MRM is an amount of physical memory that will be removed, FMAX is the reduced file cache size, and FCUR is a current amount of physical memory that is being used for storage of file pages.

13. The system of claim 10, wherein the means for reducing the original file cache size and means for performing the memory removal operation operate in response to receiving a dynamic logical partition operation that requires reallocation of physical memory.

14. The system of claim 10, wherein the system part of a logically partitioned data processing system.

* * * * *